(12) United States Patent
Alecu

(10) Patent No.: US 12,319,117 B2
(45) Date of Patent: Jun. 3, 2025

(54) HEAT EXCHANGER AND METHOD OF OPERATION

(71) Applicant: PRATT & WHITNEY CANADA CORP., Longueuil (CA)

(72) Inventor: Daniel Alecu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 288 days.

(21) Appl. No.: 18/307,855

(22) Filed: Apr. 27, 2023

(65) Prior Publication Data

US 2024/0359526 A1    Oct. 31, 2024

(51) Int. Cl.

| B64D 33/08 | (2006.01) |
|---|---|
| B60H 1/00 | (2006.01) |
| F28D 1/06 | (2006.01) |
| F28F 13/00 | (2006.01) |
| F28F 13/02 | (2006.01) |
| F28F 13/12 | (2006.01) |
| F28D 21/00 | (2006.01) |
| G10K 11/172 | (2006.01) |

(52) U.S. Cl.
CPC .......... B60H 1/00321 (2013.01); B64D 33/08 (2013.01); F28D 1/06 (2013.01); F28F 13/003 (2013.01); F28F 13/02 (2013.01); F28F 13/12 (2013.01); *B60H 2001/006* (2013.01); *F28D 2021/0021* (2013.01); *G10K 11/172* (2013.01)

(58) Field of Classification Search
CPC .. B64D 15/04; F28D 2021/0021; B64C 21/02
See application file for complete search history.

(56) References Cited

U.S. PATENT DOCUMENTS

| 2,783,008 | A | * | 2/1957 | Bodine, Jr. | B64C 21/00 60/39.77 |
|---|---|---|---|---|---|
| 3,844,677 | A | * | 10/1974 | Evans | F01D 5/14 416/228 |
| 3,972,383 | A | * | 8/1976 | Green | G10K 11/161 181/292 |
| 3,991,849 | A | * | 11/1976 | Green | G10K 11/161 244/1 N |
| 4,023,644 | A | * | 5/1977 | Cowan | F04D 29/667 137/15.1 |
| 4,802,642 | A | * | 2/1989 | Mangiarotty | B64C 23/00 244/130 |
| 4,923,146 | A | * | 5/1990 | Anthony | B64C 1/38 244/119 |
| 6,176,454 | B1 | * | 1/2001 | Grosche | B64C 23/04 244/208 |
| 7,975,966 | B2 | * | 7/2011 | De Souza | B64D 15/04 244/134 B |

(Continued)

*Primary Examiner* — Justin M Benedik
(74) *Attorney, Agent, or Firm* — NORTON ROSE FULBRIGHT CANADA LLP

(57) ABSTRACT

The heat exchanger can include one or more Helmholtz resonator having a cavity internal to the skin of the vehicle, the cavity delimited by a wall, the Helmholtz resonator having an aperture formed across the skin and fluidly connecting the cavity to the atmosphere, the cavity extending in the forward orientation of motion relative the aperture, an open cell structure filling at least a portion of the cavity; and a fluid passage internal to the skin, the fluid passage in thermal communication with the cavity via the wall of the cavity.

20 Claims, 8 Drawing Sheets

(56) References Cited

U.S. PATENT DOCUMENTS

| | | |
|---|---|---|
| 8,720,828 B2 | 5/2014 | Behrens et al. |
| 2006/0022092 A1* | 2/2006 | Miller ..................... B64C 21/02 244/200.1 |
| 2017/0292795 A1 | 10/2017 | Waissi et al. |
| 2017/0321603 A1* | 11/2017 | Zebian .................... F02K 1/827 |

* cited by examiner

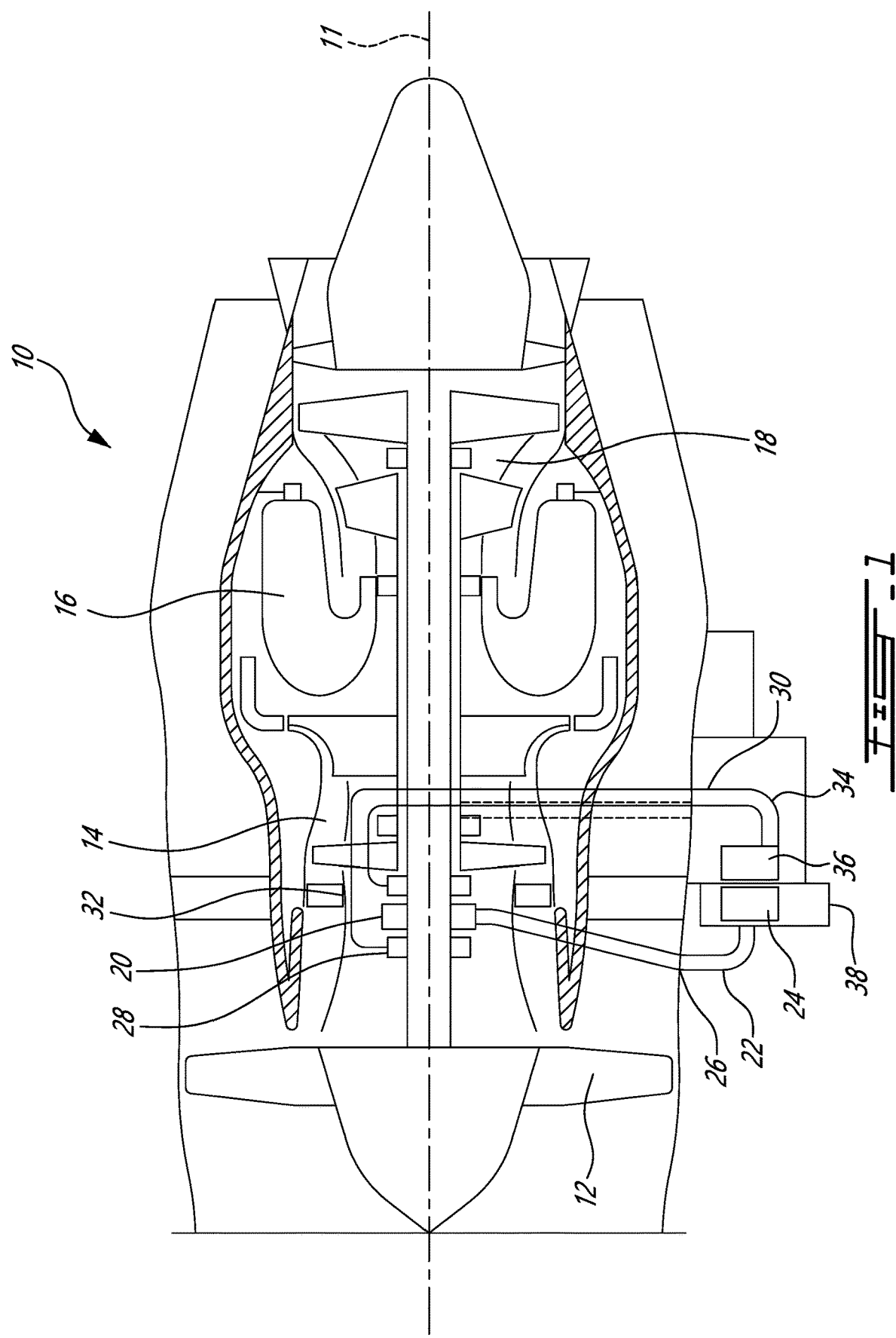

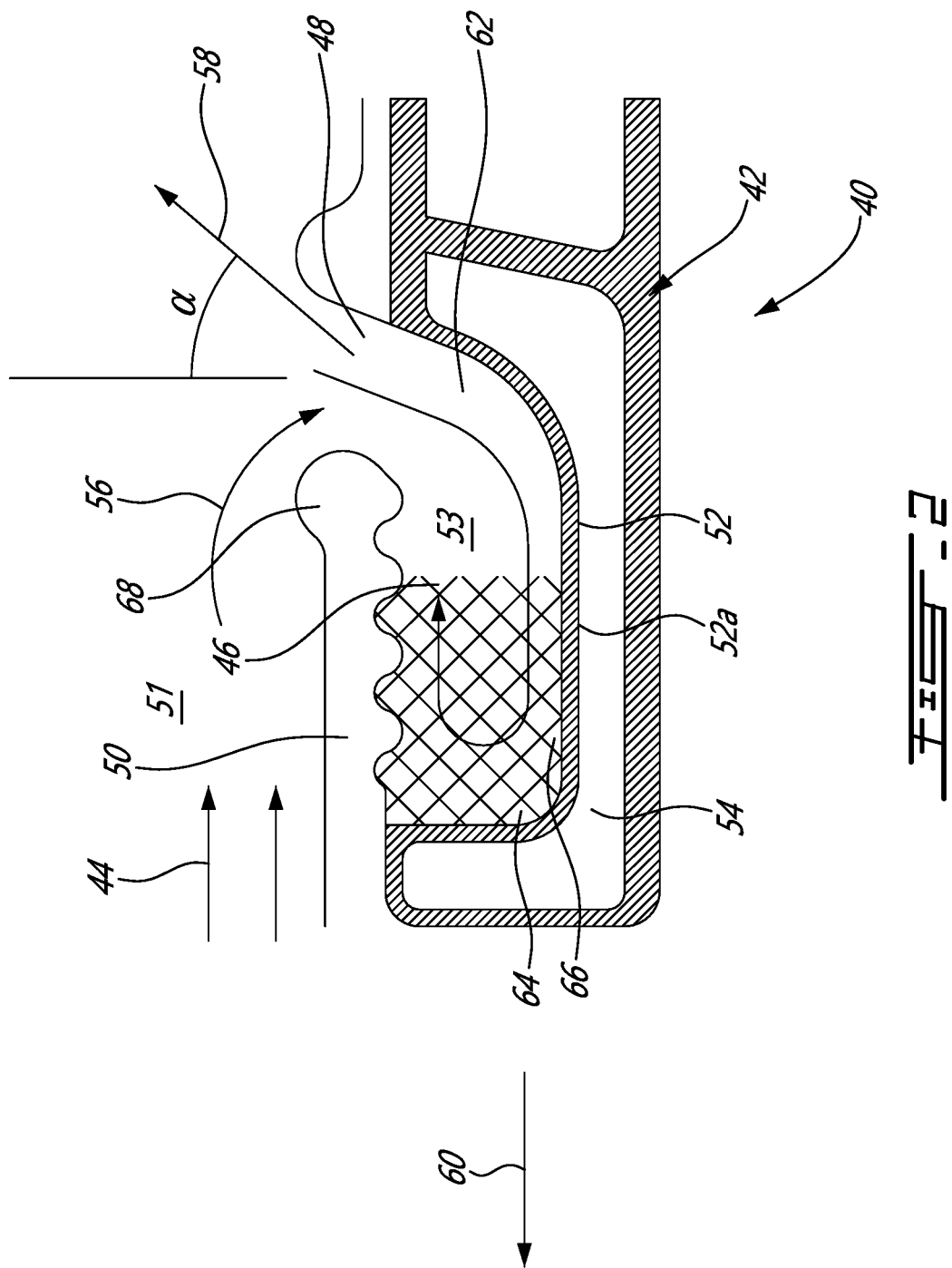

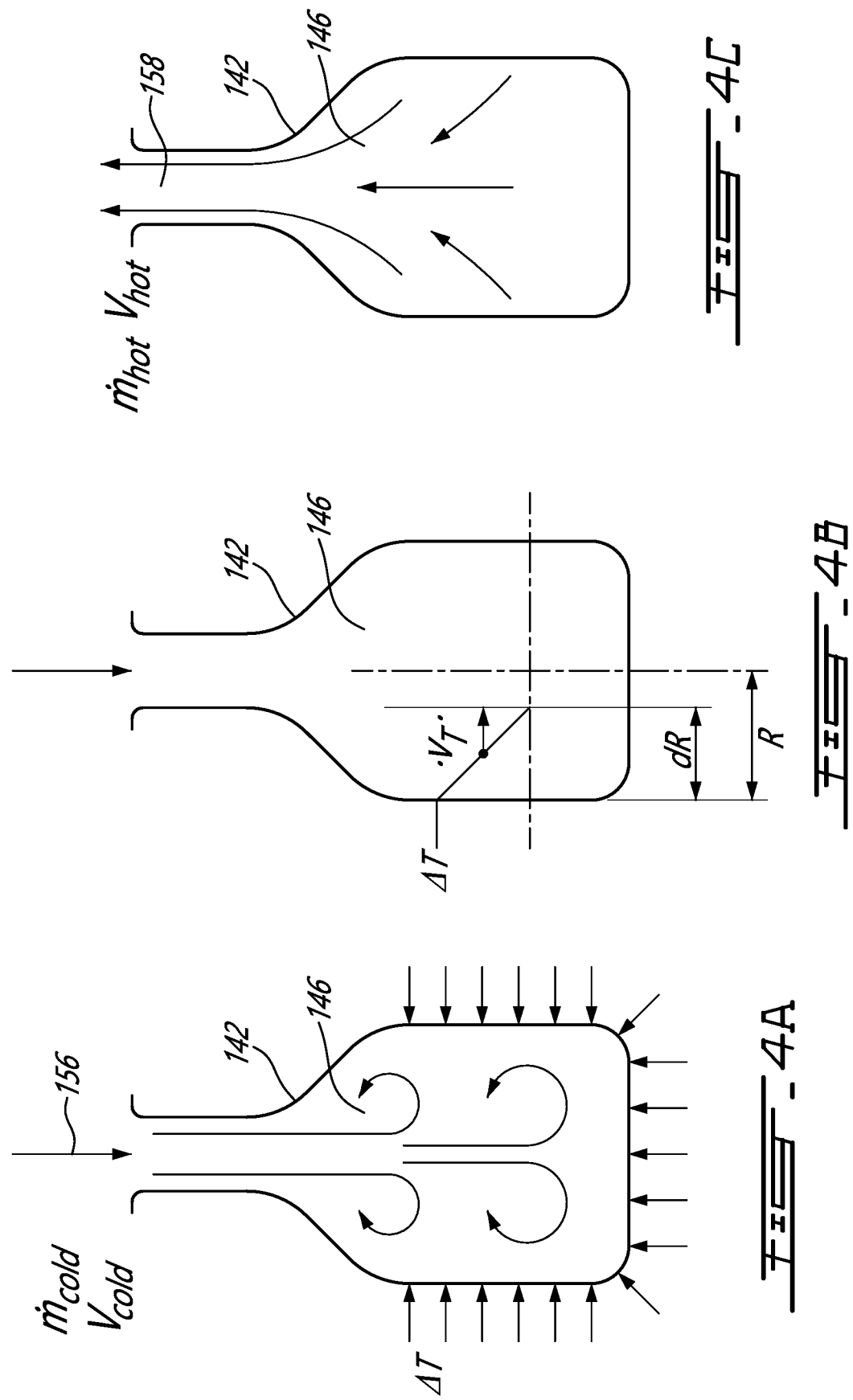

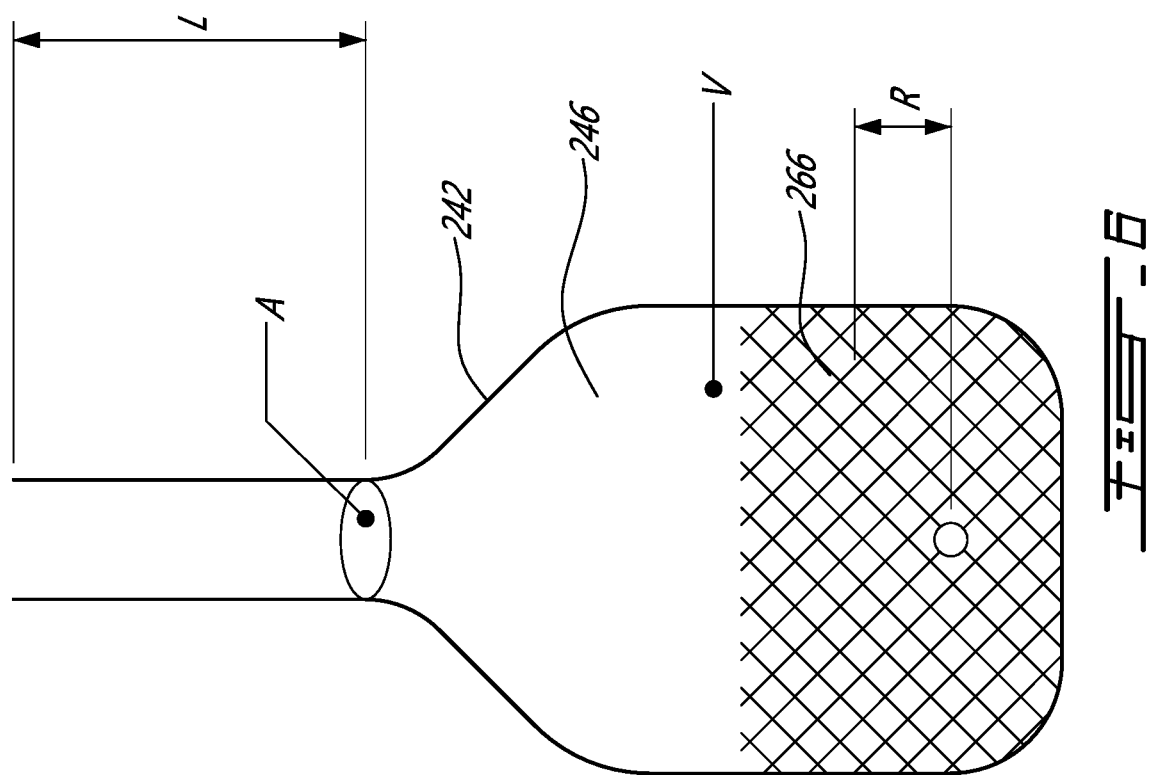

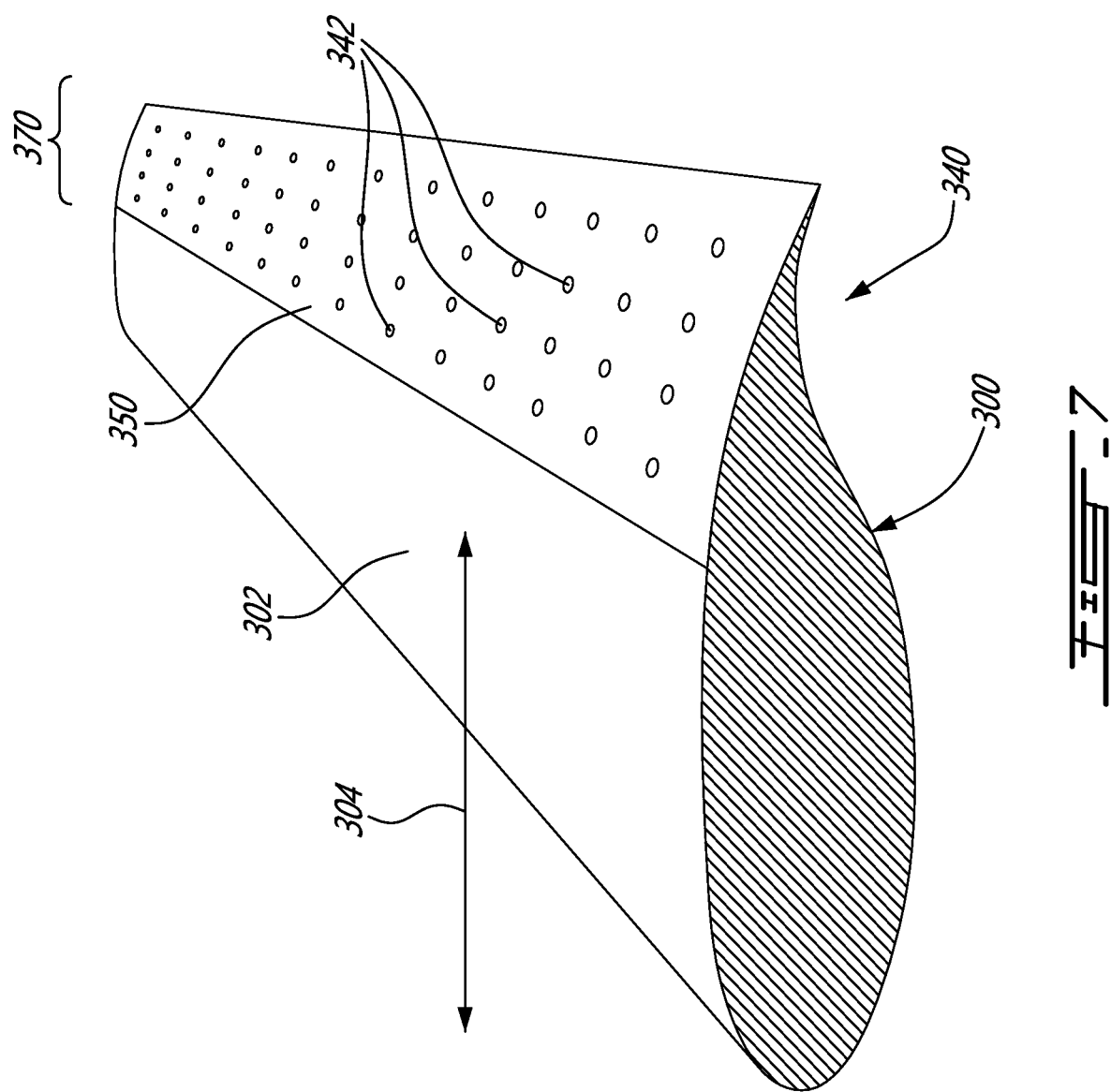

HEAT EXCHANGER AND METHOD OF OPERATION

TECHNICAL FIELD

The application relates generally to vehicles, more specifically to aircraft such as airplanes, and, more particularly, to a heat exchanger therefor.

BACKGROUND OF THE ART

Engine heat management is a concern in aeronautics. The air required to cool the radiators enters at the flight speed, loses a significant amount of pressure and is released back to the mainstream at lower velocity. The difference between the air inlet momentum and outlet momentum is net drag. The net drag may be as high as 15% of the propeller thrust for high-speed propeller planes.

One advantage of the gas turbine is that it may not require additional cooling compared to internal combustion engines or hybrid power plants. The gas turbine can use ⅔ of the ingested air for internal cooling and releases the air mixed with the combustion product at high energy creating net thrust instead of net drag. In cruise, a gas turbine may produce extra thrust on top of the propeller just from the exhaust. In a nutshell, the gas turbine may provide a thrust advantage compared to other power plants, which, combined to the low weight and compact packaging, may cancel the higher cycle efficiency of competing power plants. These latter factors have contributed to the significant success of this engine architecture over the last decades.

However, there always remains room for improvement. For instance, recent years have seen a significant increase in environmental awareness which has placed significant pressure on engine efficiency. Such pressures may motivate the use of other engine types, such as hybrid engines for instance, and may bring the challenges associated with engine heat management back to the top portion of the priority list in terms of design considerations.

SUMMARY

In one aspect, there is provided a heat exchanger for a vehicle, the vehicle having a forward direction of motion, the heat exchanger comprising: a skin of the vehicle, the skin having an external side and an internal side, the external side of the skin exposed to a flow of air during the motion of the vehicle in the forward direction; a cavity at the internal side of the skin, the cavity delimited by a wall; an aperture formed across the skin and fluidly connecting the cavity to the flow of air, the cavity extending in the forward direction of motion relative to the aperture; an open cell structure filling at least a portion of the cavity; and a fluid passage in thermal communication with the cavity via the wall of the cavity.

In another aspect, there is provided a method of cooling a fluid in a vehicle having a skin and a cavity internal to the skin, the cavity in fluid communication with atmospheric air across the skin, the method comprising: the vehicle moving in a forward direction and imparting a relative flow of the atmospheric air along the skin; the relative flow of the atmospheric air fluidly communicating with the cavity across the skin and imparting a circulation of atmospheric air into and back out from the cavity in accordance with a Helmholtz resonance of the cavity; circulating the fluid along a wall of the cavity, the fluid being hotter than the atmospheric air inside the cavity; and transferring heat from the fluid to the atmospheric air inside the cavity, the transferred heat amplifying the Helmholtz resonance.

In a further aspect, there is provided an aircraft comprising: a forward direction of motion; an engine; a skin, the skin having a region of turbulent flow during motion in said forward direction of motion; a Helmholtz resonator having a cavity internal to the skin, the cavity delimited by a wall, the Helmholtz resonator having an aperture formed across the skin, at the region of turbulent flow, and fluidly connecting the cavity to an atmosphere, the cavity extending in the forward direction of motion relative the aperture, an open cell structure filling at least a portion of the cavity; and a fluid passage internal to the skin, the fluid passage in thermal communication with the cavity via the wall of the cavity.

DESCRIPTION OF THE DRAWINGS

Reference is now made to the accompanying figures in which:

FIG. 1 is a schematic cross-sectional view of a gas turbine engine;

FIG. 2 is a schematic cross-sectional view of a heat exchanger, in accordance with an embodiment;

FIG. 4A to 4C are schematic cross-section views of a Helmholtz resonator subjected to heating at the cavity, schematically representing different portions of the resonance cycle;

FIG. 6 is a schematic cross-sectional view of a heat exchanger in accordance with another embodiment;

FIG. 7 is a fragmented view of a vehicle showing a wing of an aircraft having a heat exchanger with a plurality of Helmholtz resonators.

DETAILED DESCRIPTION

Figure 3C:
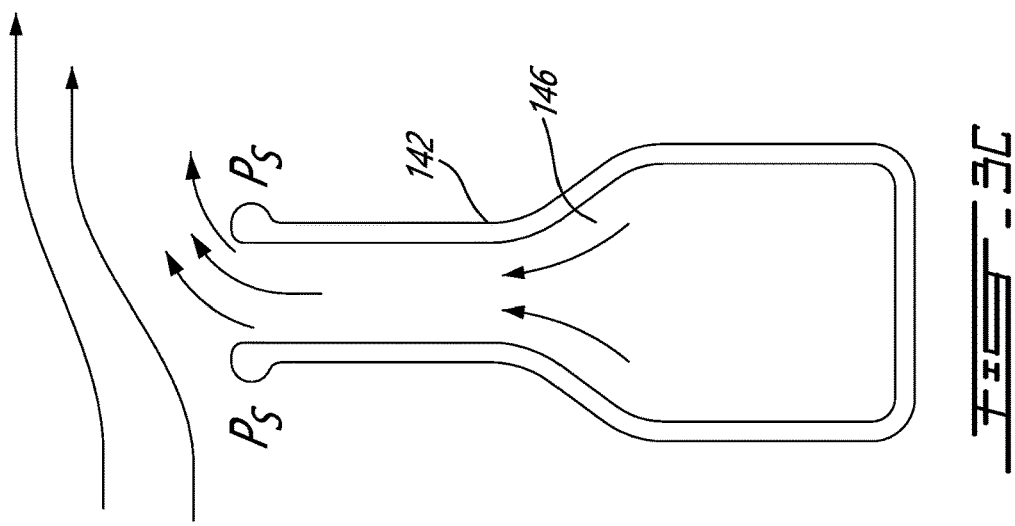
FIG. 3A to 3C are schematic cross-section views of a Helmholtz resonator schematically representing different portions of the resonance cycle.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases around the engine axis 11, and a turbine section 18 for extracting energy from the combustion gases.

The compressor 14, fan 12 and turbine 18 have rotating components which can be mounted on one or more shafts. Bearings 20 are used to provide smooth relative rotation between a shaft and casing (non-rotating component), and/or between two shafts which rotate at different speeds. An oil lubrication system 22 including an oil pump 24, sometimes referred to as a main pump, and a network of conduits and nozzles 26, is provided to feed the bearings 20 with oil. Seals 28 are used to contain the oil. A scavenge system 30 having cavities 32, conduits 34, and one or more scavenge pumps 36, is used to recover the oil, which can be in the form of an oil foam at that stage, from the bearings 20. The oil pump 24 typically draws the oil from an oil reservoir 38, and it is relatively common to use some form of air/oil separating device in the return line. Oil used in bearing lubrication is one example of a fluid which may need to be cooled during engine operation. Another example is cooling air which may be circulated to and/or from the hot section of the gas turbine engine.

FIG. 2 presents an example of a heat exchanger 40 for a vehicle such as an aircraft (e.g. an airplane, a helicopter). The heat exchanger 40 can have a Helmholtz resonator 42 configured to operate on the basis of a relative flow 44 of atmospheric air. The Helmholtz resonator 42 generally has a cavity 46 fluidly communicating with the relative flow of atmospheric air via an aperture 48. The cavity 46 is partitioned from the relative flow 44 by a wall 52 and/or skin 50 except via the aperture 48. The aperture 48 can be provided across a skin 50 of the vehicle. More specifically, the skin 50 can have an internal side 53 and an external side 51. The aperture 48 can fluidly connect the internal side 53 to the external side 51. The skin 50 can be exposed to the flow 44 of atmospheric air at its external side 51. The cavity 46 can be provided at the internal side 53 of the skin 50, and thus, the aperture 48 can fluidly connect the cavity 46 with the relative flow 44 of atmospheric air. The skin 50 can be a body of another type of vehicle, such as a car for instance, though the need may be particularly felt in the case of aircraft engines in airplanes. The cavity 46 is delimited by a wall 52. The skin 50 can form part of the wall 52 of the Helmholtz resonator 42 or can be distinct from the wall 52. The relative flow 44 of atmospheric air can be imparted by movement of the vehicle in the atmospheric air, which movement may be driven by an engine (e.g. airplane during flight). A fluid passage 54 where the hot fluid, such as oil from the engine 10, is conveyed, can be in thermal communication with the cavity 46 via the wall 52, such as via a portion 52a of the wall 52 other than the skin 50. In this example, oil is circulated along a portion 52a of the wall 52 opposite the skin 50. The fluid passage 54 can be an oil passage. In particular, there can be a more pronounced oil cooling requirement when the engine or engines of the vehicle is a thermal engine, such as a piston engine or a Wankel engine, than when the engine is a turbine engine. More specifically, the thermal communication (heat transfer) between the fluid passage 54 and the cavity 46 can involve convection on both sides of the wall 52 and conduction across the wall 52, for instance.

During operation, the relative flow 44 of atmospheric air can fluidly communicate with the cavity 46 across the skin 50, via the aperture 48, and impart a circulation of atmospheric air into 56 and back out from 58 the cavity 46, in accordance with a Helmholtz resonance of the cavity 46. The hot fluid, being hotter than the atmospheric air in the cavity 46, can be circulated along the wall 52 of the Helmholtz resonator 42. Heat from the hot fluid can be transferred to the atmospheric air inside the cavity 46, simultaneously cooling the hot fluid and heating up the air. The heating of the air can contribute to amplify the Helmholtz resonance.

As seen in the example embodiment presented in FIG. 2, the cavity 46 can extend parallel to the skin, in the forward direction 60 of motion of the vehicle. The cavity 46 can be said to have a proximal end 62 coinciding with the aperture 48, and a distal end 64 opposite the aperture 48. The distal end 64 can be forward of the proximal end 62 relative the forward direction 60 of motion of the vehicle. An open cell structure 66 can be present inside the cavity 46. The open cell structure 66 can fill a portion of the cavity 46, such as a portion of the cavity adjacent the distal end 64 for instance, which may be referred to as a distal portion of the cavity 46. Another portion of the cavity 46 can be left free of the open cell structure 66. The portion of the cavity which is free of the open cell structure 66 can be between the open cell structure 66 and the aperture 48, e.g. in a proximal portion of the cavity 46. Alternately the open cell structure 66 can fill an entirety of the cavity. The open cell structure 66 can be made of a material having a high thermal conductivity, such as a metal, and can be in thermally conductive contact with the wall 50, to favor heat transfer from the hot fluid to the cooler air in the cavity 46. An aerodynamic bump 68 may be incorporated to the external face of the skin 50, in front of, and optionally fully around, the aperture 48, to favor the operation. The external face of the skin 50 being the face of the skin 50 which is exposed to the environment in this example.

Before looking into example values of different parameters, or different additional, optional features, of the heat exchanger, let us first discuss principles of operation of a Helmholtz resonator.

Figure 3B:
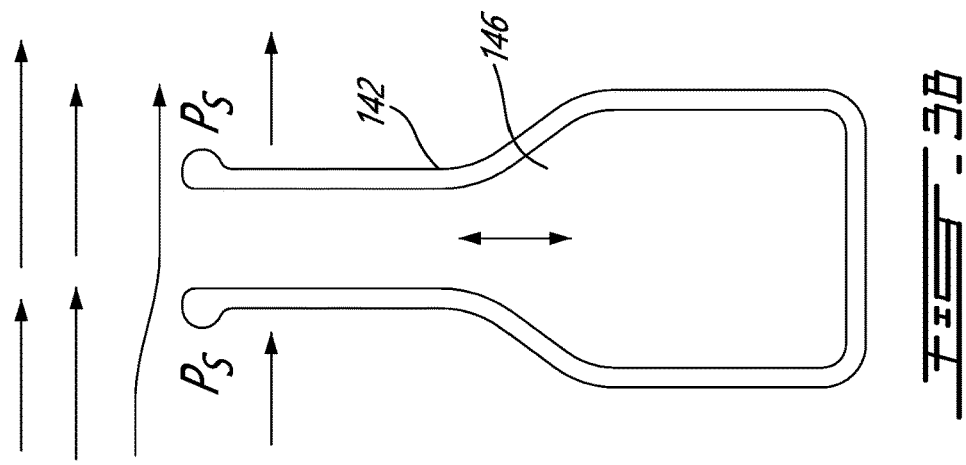
Figure 3A:
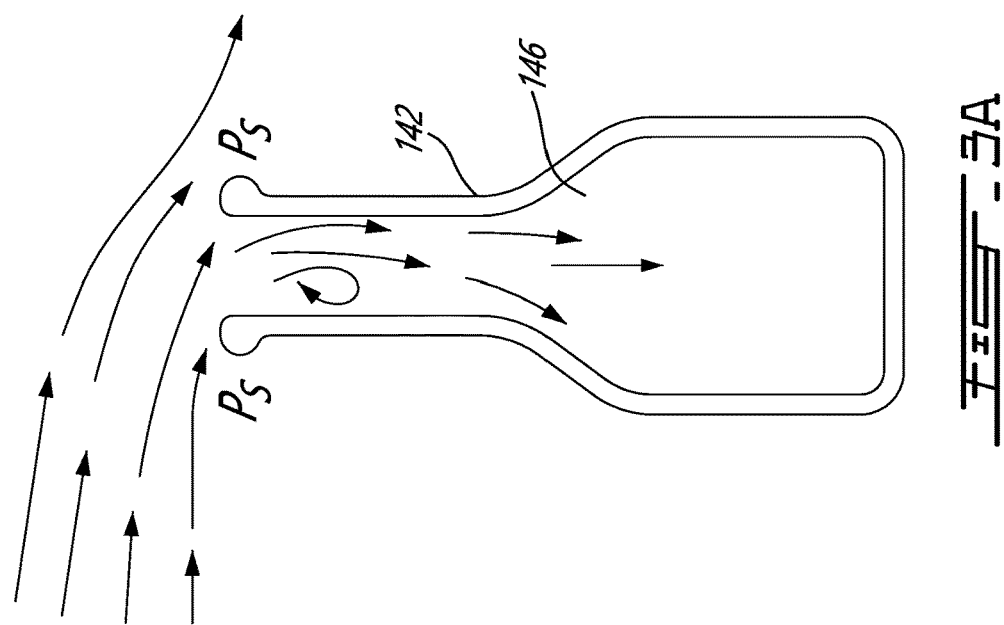

With reference to FIGS. 3A, 3B and 3C, a simple example of a Helmholtz resonator 142 is a bottle. When one blows air at the top, a clean harmonic sound can be produced. The (aerodynamic) rounded lip of the neck allows the flow to turn smoothly, aerodynamically, into the cavity 146 of the bottle as illustrated at FIG. 3A. The turning flow has a total pressure higher than the ambient static pressure (atmospheric pressure), since it also includes dynamic pressure. In a first step of the cycle which repeats itself at the Helmholtz frequency (the frequency of the clean harmonic sound), the dynamic pressure is partially recovered into the bottle cavity volume, temporarily increasing the pressure inside the bottle to above atmospheric pressure. As the pressure in the cavity volume raises above the ambient static pressure $P_s$, the air stream in the neck slows down and, due to inertia, continues to drive up the pressure in the cavity volume, possibly higher than the main stream total pressure. At one point, as illustrated at FIG. 3B, the flow can no longer enter the bottle and the flow in the neck stagnates. As illustrated in FIG. 3C, the flow in the neck then reverses and the excess pressure in the body accelerates the air in the neck against the ambient static pressure (perpendicular to the mainstream). As the pressure in the body volume drops below the ambient static pressure, the flow inertia in the neck continues to drive the cavity volume pressure even lower before reversing again and repeating the cycle. Acoustic frequencies are in the order of 20 to 20 000 Hz, meaning that for the sound from the bottle to be audible, the cycle repeats 20 to 20 000 times per second (a typical bottle may have a frequency around 150-200 Hz).

Let us now consider the special case of a Helmholtz resonator 142 in which the air in the cavity 146 receives heat during operation, with reference to FIGS. 4A, 4B and 4C. The incoming cold stream 156 gets heated in the cavity at a rate ∂T/∂x depending on the gas properties, namely fluid density ρ and specific heat $C_p$ and effective turbulent viscosity/diffusion rate, and the conduction coefficient K, in accordance with $$K \frac{\partial T}{\partial x} = \rho C_p \frac{\partial T}{\partial t}. \qquad (1)$$

Figure 5A:
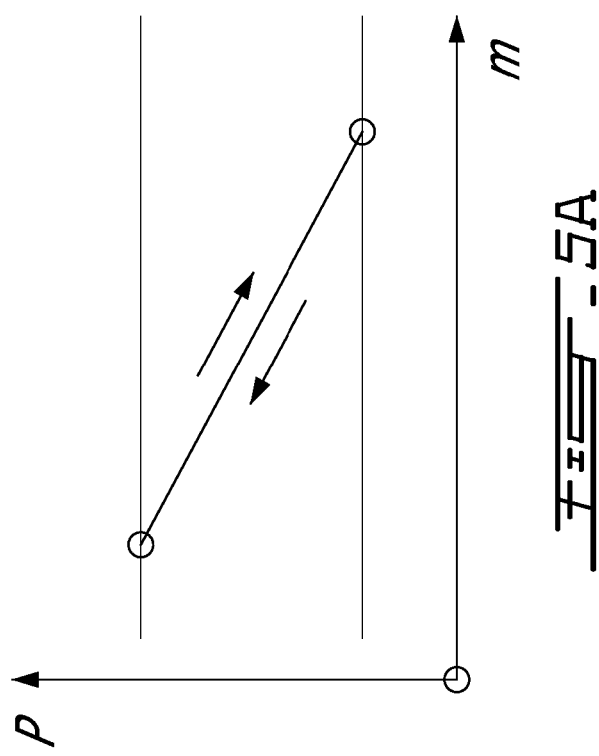
FIGS. 5A and 5B are graphs representing a thermodynamic cycle in the heat exchanger.
Figure 5B:
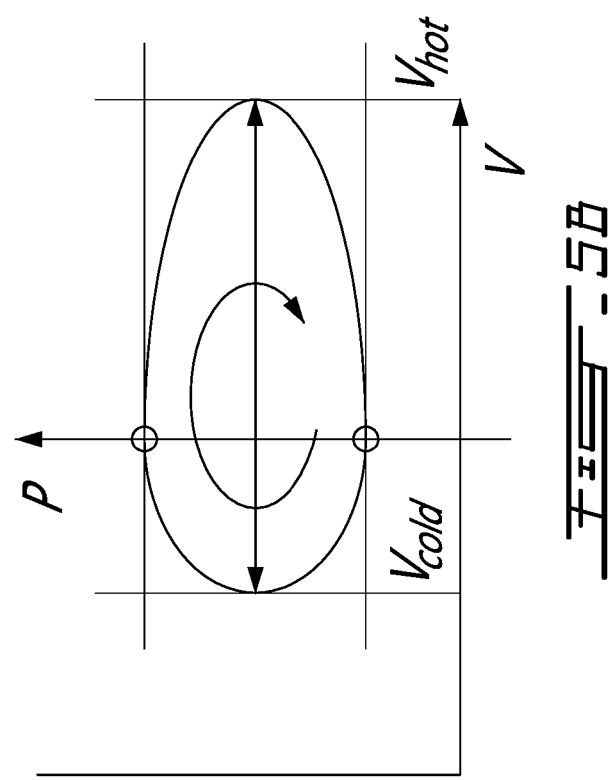

The expelled (hotter) stream 158 exits the neck at a speed higher than the incoming cold stream 156, effectively the Helmholtz resonance completing a thermodynamic cycle with a net positive work added to the air involved in the cycle. The thermodynamic cycle is schematically presented at FIGS. 5A and 5B with P being the pressure, m being the bottle mass content, and V being the velocity of the air in the neck, in arbitrary units. $V_{hot} > V_{cold}$ whereas $\dot{m}_{hot} = \dot{m}_{cold}$. The velocity of the heated front for stagnant air is fairly small, about $2^{-5}$ m/s, based $v_T$ on $$v_T = \frac{\partial T}{\partial t} = \frac{K}{\rho C \rho} \cong \frac{0.025}{1.25 \times 1000} \quad (2)$$

Under typical turbulent conditions, the turbulent diffusion rate may be 100× higher than for stagnant air, which may raise the velocity of the heated front to $2^{-3}$ m/s.

Such factors may be taken into consideration to balance the thermodynamic cycle, i.e. the compromise between the oscillation frequency, depending on the cavity geometry, and the heat propagation. The smaller the geometric features the higher the frequency but also an increased proportion of the ingested air is heated.

Let us now introduce certain parameters of cavity design with reference to FIG. 6. In this example Helmholtz resonator 242, an open cell structure 266 fills a portion of the cavity 246. More specifically: L—equivalent neck length; A—equivalent neck cross-section area; V equivalent cavity volume; R—open cell structure characteristic dimension.

The cavity design may provide decreased frequency at given dimensions, i.e. longer neck and smaller volume, and decreased characteristic dimension for the heat propagation. For the latter, an open cell structure such as metallic open cell foam or wool with cell dimension significantly smaller than the cavity volume may be appropriate.

In one embodiment, it was found that the following relationships may be significant:

$$T = \frac{2\pi}{C} \sqrt{\frac{V \cdot L}{A}} \quad (3)$$

where T—harmonic oscillation period; c—speed of sound in air in cavity; and $$\frac{R}{T} \sim \frac{M \cdot K_{gas}}{\rho \cdot C_p} \quad (4)$$

where $K_{gas}$—air laminar conductivity and M—turbulent relative diffusion.

Accordingly, in some embodiments, the Helmholtz resonance effect can be balanced for the purpose of cooling by adjusting R/T to be within 10 times more or 10 times less than $$\frac{M \cdot K_{gas}}{\rho \cdot C_p},$$

within 5 times more or 5 times less, or within e (i.e. about 2.7) times more and e times less.

Returning to an embodiment having a cavity geometry generally as shown in FIG. 2, it will be noted that the design can be configured in a manner for the neck to ingest both boundary layer and active positive dynamic pressure air; for the neck to expel hot air 58 at an angle α predominantly pointing downstream, or otherwise said, rearwardly relative the forward direction (rear direction); for the ingested cold stream 56 to be directed towards the bottom of the cavity 46, e.g. a wall portion 52a opposite the skin, to circulate along the bottom of the cavity 46 as it is heated up and return via the top, e.g. adjacent the skin; for at the maximum pressure, the incoming cold stream 56 to be interrupted and heated air 58 to start being expelled; for forming a slanted jet away from the external surface of the skin 50; and for the air mass ingested and expelled at each cycle to be significantly smaller than the total air mass in the cavity, which feature can allow the air to be heated at a higher achievable temperature before being expelled.

The above-mentioned operation can be comparable to an infinitely thin boundary layer at extremely high Reynolds number, without generating the same skin friction loss, on the contrary, the apparent friction may be negative due to the downstream angle of the emerging jet.

The characteristic dimension of the open cell structure 66, 266 can be in the order of the millimetre, or be in the sub-millimeter range, for instance. Various types of open cells structures exist and may be considered useful depending on the embodiment. It may be more convenient, if using additive manufacturing, to use an open cell structure which is periodic, i.e. which has a unit cell which is repeated in three dimensions, i.e. along three non-parallel—typically orthogonal—vectors, in a manner to fill the volume associated with the corresponding portion of the cavity. Such a periodic structure may form a 3D lattice for instance. The unit cell of such a periodic structure may form air passages along each one of the three axes, while providing a certain degree of structure to favor heat transfer. Different forms of periodic structures may be suitable to perform such structures, such as a gyroid structure or a lidinoid structure. This being said, in some embodiments, it may be preferred to use a stochastic open cell structure such as a foam or wool. In some embodiments, it can be preferred for the open cell structure to form air passages in at least two dimensions, as opposed to, say, a honeycomb or other extrusion forming an air passage in a single dimension (i.e. a plurality of paths oriented parallel to one another).

It will also be noted that depending on the embodiment, the open cell structure 66, 266 can consist of different regions which can have different periodic structures or different scales for instance, or even gradually varying scales for instance, and many variants can be implemented in view of a specific embodiment. In one embodiment, it may be suitable to embody the open cell structure with a variable pore size along one (or more) of the axes of the periodic structure. In some embodiments, different portions of the cavity can have corresponding open cell structures where the cell shape, pore size and/or periodicity of the open cell structure is different from one portion to another. In one example embodiment, rather than having different regions having different densities, or a varying density, the open cell structure can have a different patterns in different regions, such as having a first region of the volume having a gyroid open cell structure, and a second region of the volume having a lidinoid cell structure. Embodiments with changes in the open cell structures in different regions of the volume of the cavity may be implemented in order to increase air flow in some regions where air flow is deemed more important than heat transfer, while increasing structure in some other regions where heat transfer is deemed more important than air flow, for instance.

In some embodiments, the heat-exchanger 40 can have a single Helmholtz resonator 42, and thus a single cavity 46. In other embodiments, the heat-exchanger 340 can have a plurality of Helmholtz resonators 342 distributed along a portion of the skin 350 of the vehicle 300.

Referring to FIG. 7, for instance, in one embodiment, the heat exchanger 340 can have a plurality of Helmholtz resonators 342 with corresponding cavities (only the apertures being visible) distributed in an array on the aerodynamic surface of the wing, fuselage, engine nacelle, control surfaces, or other suitable surfaces. In the specific example of FIG. 6, a plurality of Helmholtz resonators 342 are arrayed in a trailing portion 370 of the wing 302 of an aircraft, at optimally chosen location.

In the specific example of FIG. 7, the heat exchanger 340 is integrated to a wing 302 using a supercritical laminar airfoil. In such case one possible distribution for the Helmholtz resonator array would be aft of 60% chord 304 taken from the leading edge, where the boundary layer can be expected to start transitioning from laminar to turbulent during operation. Such regions of turbulent flow can be preferred, and may be present at other regions of the airplane, such as the boat tail. The Helmholtz resonators 342 can be distributed along the skin portion which is associated to a region of turbulent flow, such as in an arrayed configuration.

The action of the generated net zero mass flow jets can be similar to that of vortex generators, i.e. energizing the boundary layer, yet without the penalty imposed on the main stream, which is the energy source for the vortex generators. The energizing of the boundary layer can reduce form drag, which can be of interest a low angles of attack typical for cruise conditions, but may also delay the stall thus increasing the maximum angle of attack and consequently the maximum lift coefficient. The latter may snowball in a positive manner at system level, for example increased maximum takeoff weight, reduced takeoff distance, simplified flaps or no flaps.

Each active Helmholtz resonator may generate a high single harmonic sound, however the jet is second order source with short distance propagation. Also, the Helmholtz resonators may have different resonant frequencies. Helmholtz resonators having lower resonance frequency can be configured to oscillate in opposite phase with the higher resonant frequency Helmholtz resonators, resulting in partial phase cancelation, and noise attenuation. The effect can be enhanced deliberately by distributing uniformly the resonant frequency range spatially over the array, such as alternating higher-resonant frequency Helmholtz resonators with lower-resonant frequency Helmholtz resonators in the array in a way for Helmholtz resonators in the array to attenuate or cancel out the sound of adjacent ones of the Helmholtz resonators in the array. The air source for the Helmholtz resonators can be boundary layer having low inlet momentum. The heat transfer can be favored by conductive open cell structure, remanent turbulent diffusion and pressure gain. The air release can be active with hot jet at a velocity comparable to the main stream velocity. There may be no secondary drag, and positive momentum may be added to the boundary layer, leading to possible form drag reduction at aerodynamic structure level (e.g. wing level). There may be no significant extra weight except for hot fluid passage, other features can be provided integral with the skin or underlaying honeycomb like structure.

Figure 8:
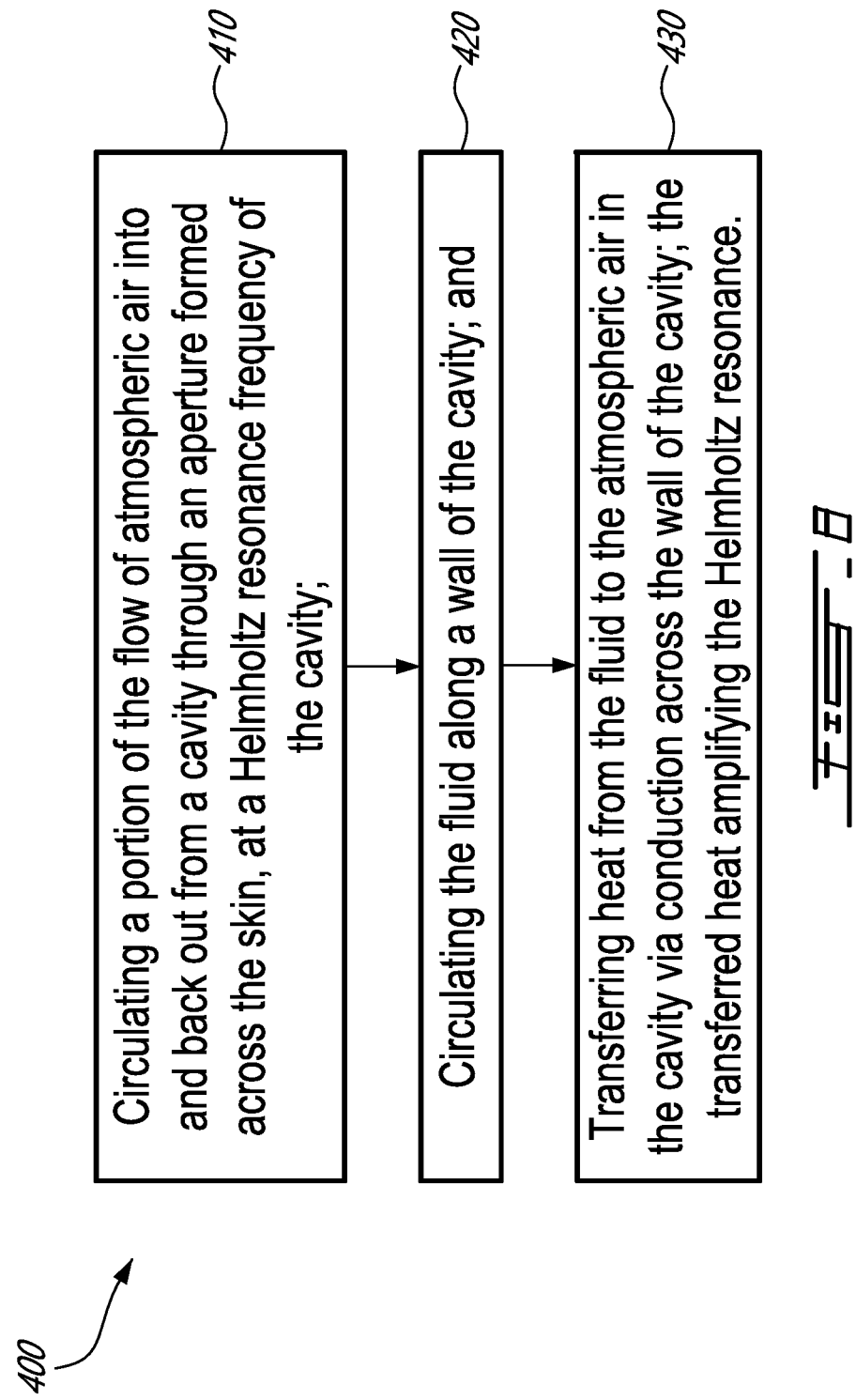
FIG. 8 is a flow chart of a method of operating a heat exchanger.

Referring to FIG. 8, a method 400 of operating a heat exchanger is presented in accordance with an embodiment. More specifically, the method can involve cooling a fluid in a vehicle having a skin and a cavity internal to the skin, the cavity in fluid communication with atmospheric air across the skin. The method 400 can include circulating 410 a portion of the flow of atmospheric air into and back out from a cavity through an aperture formed across the skin, at a Helmholtz resonance frequency of the cavity; circulating 420 the fluid along a wall of the cavity; and transferring 430 heat from the fluid to the atmospheric air in the cavity via conduction across the wall of the cavity; the transferred heat amplifying the Helmholtz resonance.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the cooler may either be localized or distributed in an array; the cooler may be located on the aerodynamic surface of the wing, fuselage, engine nacelle, control surfaces or any other optimally chosen location; the specific dimensions of the cooler (neck, active volume, etc.) may be set as deemed optimal for heat transfer and/or air positive air momentum contribution; the positive momentum contribution of the cooling air may be used for any means deemed aerodynamically suitable; the conductive material of the cooler matrix may be chosen as needed; the hot fluid may be oil, air or any other fluid type for which cooling is desired; the body volume may or may not be filled with open cell foam or similar conductive microfeatures. Yet further modifications could be implemented by a person of ordinary skill in the art in view of the present disclosure, which modifications would be within the scope of the present technology.

The invention claimed is:

1. A heat exchanger for a vehicle, the vehicle having a forward direction of motion, the heat exchanger comprising:
 a skin of the vehicle, the skin having an external side and an internal side, the external side of the skin exposed to a flow of air during the motion of the vehicle in the forward direction;
 a cavity at the internal side of the skin, the cavity delimited by a wall, an aperture formed across the skin and fluidly connecting the cavity to the flow of air, the cavity extending in the forward direction of motion relative to the aperture;
 an open cell structure filling at least a portion of the cavity; and
 a fluid passage in thermal communication with the cavity via the wall of the cavity.

2. The heat exchanger of claim 1 wherein the cavity has a portion free of the open cell structure, the portion free of the open cell structure being between the open cell structure and the aperture.

3. The heat exchanger of claim 1 wherein the skin has an aerodynamic bump in front of the aperture.

4. The heat exchanger of claim 3 wherein the aerodynamic bump surrounds the aperture.

5. The heat exchanger of claim 1 wherein the open cell structure is made of a metal and is in conductive contact with the wall of the cavity.

6. The heat exchanger of claim 1 wherein the open cell structure has a characteristic dimension of sub-millimeter size.

7. The heat exchanger of claim 1 wherein the open cell structure has a characteristic dimension R, the cavity and the aperture defining a Helmholtz resonator having a harmonic oscillation frequency T, the air having a laminar conductivity $K_{gas}$, a turbulent relative diffusion value M, a density $\rho$ and a specific heat $C_p$, wherein R/T is within 2.7 times more and 2.7 times less than $M \cdot K_{gas}/\rho \cdot C_p$.

8. The heat exchanger of claim 1 wherein the cavity and the aperture define a Helmholtz resonator, the heat exchanger comprises a plurality of said Helmholtz resonator disposed in an arrayed configuration, the fluid passage in thermal communication with the cavities of the plurality of said Helmholtz resonator.

9. The heat exchanger of claim 8 wherein the Helmholtz resonators of the plurality of said Helmholtz resonator in the arrayed configuration have alternating resonance frequencies operable to phase-cancel a sound emitted by adjacent Helmholtz resonators in the arrayed configuration.

10. A method of cooling a fluid of an engine of an aircraft, the aircraft having a skin exposed to a flow of atmospheric air, the method comprising:
   circulating a portion of the flow of atmospheric air into and back out from a cavity through an aperture formed across the skin, at a Helmholtz resonance frequency of the cavity;
   circulating the fluid along a wall of the cavity; and
   transferring heat from the fluid to the atmospheric air in the cavity via conduction across the wall of the cavity; the transferred heat amplifying the circulating the portion of the flow of atmospheric air into and back out from the cavity.

11. The method of claim 10 wherein the portion of the flow of atmospheric air circulated into the cavity includes both a boundary layer and an active positive dynamic pressure.

12. The method of claim 10 wherein the circulating a portion of the flow of atmospheric air back out from the cavity is performed at an angle oriented rearwardly relative the forward direction.

13. The method of claim 10 wherein the circulating a portion of the flow of atmospheric air includes circulating the atmospheric air first along the wall of the cavity in a direction opposite a direction of movement of the aircraft in the atmospheric air, second towards the skin, and third towards the aperture in a direction of movement of the aircraft.

14. The method of claim 10 wherein a mass transfer of said portion of the flow of atmospheric air into and back out from the cavity is less than 10 times a mass of the atmospheric air in the cavity.

15. The method of claim 10 wherein the fluid is oil from the engine of the vehicle, said transferring heat from the fluid to the atmospheric air inside the cavity including cooling the oil.

16. An airplane having a forward direction of motion, comprising:
   an engine;
   a skin, the skin externally exposed to a region of turbulent flow during motion of the aircraft in said forward direction of motion;
   a Helmholtz resonator having a cavity internal to the skin, the cavity delimited by a wall, the Helmholtz resonator having an aperture formed across the skin, at the region of turbulent flow, and fluidly connecting the cavity to an atmosphere, the cavity extending in the forward direction of motion relative the aperture, an open cell structure filling at least a portion of the cavity; and
   a fluid passage internal to the skin, the fluid passage in thermal communication with the cavity via the wall of the cavity.

17. The airplane of claim 16 wherein the region of turbulent flow is a trailing portion of a wing of the aircraft.

18. The airplane of claim 16 wherein the fluid passage is fluidly connected to an oil lubrication system of the engine.

19. The airplane of claim 16 wherein the heat exchanger comprises a plurality of said Helmholtz resonator disposed in an arrayed configuration, the fluid passage in thermal communication with the cavities of the plurality of said Helmholtz resonator.

20. The airplane of claim 19 wherein the Helmholtz resonators of the plurality of said Helmholtz resonator in the arrayed configuration have alternating resonance frequencies operable to phase-cancel a sound emitted by adjacent Helmholtz resonators in the arrayed configuration.

* * * * *